United States Patent
Zhao et al.

(10) Patent No.: US 12,418,659 B2
(45) Date of Patent: Sep. 16, 2025

(54) MOTION VECTOR PREDICTION FUSION FOR SUBBLOCK-BASED TEMPORAL MOTION VECTOR PREDICTION (SbTMVP) AND TEMPORAL MOTION VECTOR PREDICTION (TMVP)

(71) Applicant: TENCENT AMERICA LLC, Palo Alto, CA (US)

(72) Inventors: Xin Zhao, San Jose, CA (US); Guichun Li, San Jose, CA (US); Lien-fei Chen, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 116 days.

(21) Appl. No.: 17/973,663

(22) Filed: Oct. 26, 2022

(65) Prior Publication Data
US 2024/0031577 A1    Jan. 25, 2024

Related U.S. Application Data

(60) Provisional application No. 63/391,193, filed on Jul. 21, 2022.

(51) Int. Cl.
*H04N 19/137* (2014.01)
*H04N 19/176* (2014.01)

(52) U.S. Cl.
CPC ......... *H04N 19/137* (2014.11); *H04N 19/176* (2014.11)

(58) Field of Classification Search
CPC .......................... H04N 19/137; H04N 19/176
(Continued)

(56) References Cited

U.S. PATENT DOCUMENTS

2011/0228840 A1* 9/2011 Yamori ............... H04N 19/513
375/240.03
2020/0336762 A1* 10/2020 Lee ...................... H04N 19/563
(Continued)

FOREIGN PATENT DOCUMENTS

CN          111989927 A          11/2020
CN          114026852 A          2/2022

OTHER PUBLICATIONS

International Search Report dated Feb. 23, 2023 in International Application No. PCT/US22/48787.
(Continued)

*Primary Examiner* — On S Mung
(74) *Attorney, Agent, or Firm* — Morgan, Lewis & Bockius LLP

(57) ABSTRACT

Method, apparatus, and non-transitory storage medium for fusing sub-block motion vector predictors into one sub-block motion vector predictor during video coding and decoding is provided. The method may include deriving a first displacement vector for a sub-block of a current block identifying a co-located sub-block of a co-located picture, and based on the identified co-located sub-block, determine whether the co-located sub-block overlaps with one or more sub-blocks associated with a motion field grid in the co-located picture. Based on determining that the co-located sub-block overlaps with the one or more sub-blocks, the method may include, retrieving two or more sub-block motion vectors respectively associated with the one or more sub-blocks. A final motion vector predictor for the sub-block of the current block may be derived based on the two or more sub-block motion vectors retrieved.

15 Claims, 17 Drawing Sheets

(58) Field of Classification Search
USPC .................................................. 375/240.02
See application file for complete search history.

(56) References Cited

U.S. PATENT DOCUMENTS

2021/0297673 A1* 9/2021 Zhang .................. H04N 19/186
2022/0217361 A1 7/2022 Zhao et al.

OTHER PUBLICATIONS

Written Opinion dated Feb. 23, 2023 in International Application No. PCT/US22/48787.

* cited by examiner

1200

1300

1400

FIG. 1F
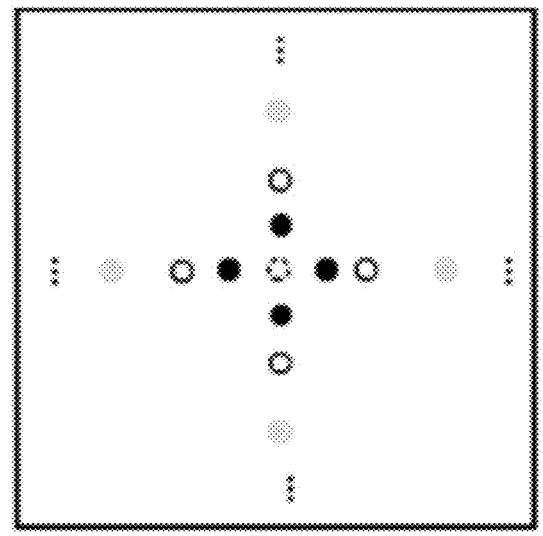
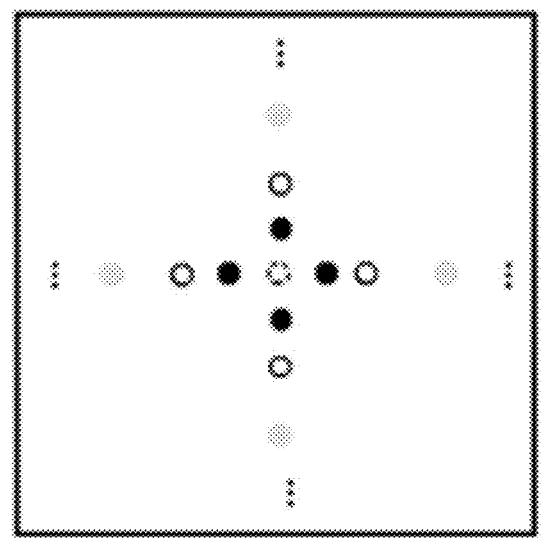
1600

1700

1800

800

MOTION VECTOR PREDICTION FUSION FOR SUBBLOCK-BASED TEMPORAL MOTION VECTOR PREDICTION (SbTMVP) AND TEMPORAL MOTION VECTOR PREDICTION (TMVP)

CROSS-REFERENCE TO RELATED APPLICATION

This application claims priority from U.S. Provisional Patent Application No. 63/391,193, filed on Jul. 21, 2022, in the United State Patent and Trademark Office, the disclosure of which is incorporated herein by reference in its entirety.

FIELD

Embodiments of the present disclosure relate to image and video coding technologies. More specifically, embodiments of the present disclosure relate to improvements in motion vector predictor fusion for SbTMVP and TMVP while coding and decoding video data.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC, and the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

SUMMARY

According to embodiments, a method for fusing sub-block motion vector predictors into one sub-block motion vector predictor during video coding may be provided. The method may include deriving, for a sub-block of a current block, a first displacement vector identifying a co-located sub-block of a co-located picture; determining that the co-located sub-block overlaps with one or more sub-blocks associated with a motion field grid in the co-located picture; based on determining that the co-located sub-block overlaps with the one or more sub-blocks, retrieving one or more sub-block motion vectors respectively associated with the one or more sub-blocks; and deriving a final motion vector predictor for the sub-block of the current block based on the one or more sub-block motion vectors retrieved.

According to embodiments, an apparatus for fusing sub-block motion vector predictors into one sub-block motion vector predictor during video coding may be provided. The apparatus may include at least one memory configured to store program code; and at least one processor configured to read the program code and operate as instructed by the program code. The program code may include first deriving code configured to cause the at least one processor to derive, for a sub-block of a current block, a first displacement vector identifying a co-located sub-block of a co-located picture; first determining code configured to cause the at least one processor to determine that the co-located sub-block overlaps with one or more sub-blocks associated with a motion field grid in the co-located picture; based on determining that the co-located sub-block overlaps with the one or more sub-blocks, retrieving code configured to cause the at least one processor to retrieve one or more sub-block motion vectors respectively associated with the one or more sub-blocks; and second deriving code configured to cause the at least one processor to derive a final motion vector predictor for the sub-block of the current block based on the one or more sub-block motion vectors retrieved.

According to embodiments, a non-transitory computer-readable medium storing instructions may be provided. The instructions, when executed by at least one processor of a device for fusing sub-block motion vector predictors into one sub-block motion vector predictor during video coding may cause the one or more processors to derive, for a sub-block of a current block, a first displacement vector identifying a co-located sub-block of a co-located picture; determine that the co-located sub-block overlaps with one or more sub-blocks associated with a motion field grid in the co-located picture; based on determining that the co-located sub-block overlaps with the one or more sub-blocks, retrieve one or more sub-block motion vectors respectively associated with the one or more sub-blocks; and derive a final motion vector predictor for the sub-block of the current block based on the one or more sub-block motion vectors retrieved.

BRIEF DESCRIPTION OF THE DRAWINGS

FIG. 1F illustrates exemplary merge with motion vector difference search point, according to an embodiment of the present disclosure.

DETAILED DESCRIPTION

Figure 1A:
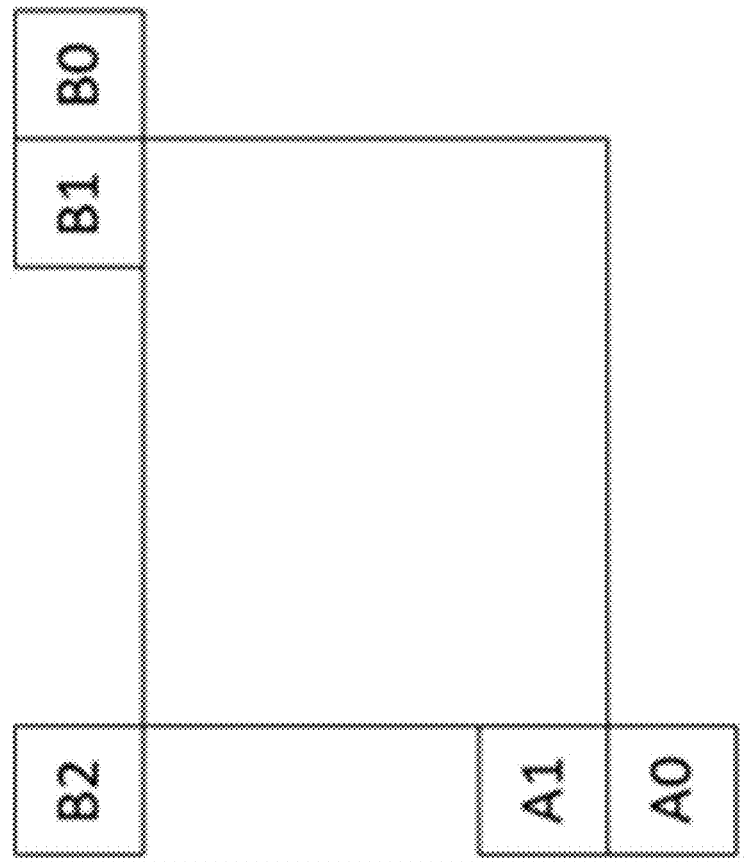
FIG. 1A illustrates examples of positions of special merge candidates, according to an embodiment of the present disclosure.

The proposed methods and processes may be used separately or in combination. Embodiments of the present disclosure relate to fusion of multiple sub-block predictors into one or more sub-block predictors in Sub-block Temporal Motion Predictor (SbTMVP).

Embodiments of the present disclosure related to fusion of multiple predictors into one or more motion vector predictors in Temporal Motion Vector Predictor (TMVP).

Displacement vector (also referred to as "motion shift") is used to identify a block or a sub-block in a reference picture to derive or determine the motion vector prediction for a current block. In the context of SbTMVP, improved SbTMVP, or TMVP, the displacement vector used for deriving or determining the motion vector of the current block may overlap with multiple sub-blocks in the reference picture. However, only the motion vector associated with one sub-block may be considered or used as the predictor in SbTMVP, improved SbTMVP, or TMVP. This using of just one motion vector when multiple relevant motion vectors are available for determining the predictor is not optimal and often results in errors.

Furthermore, while multiple co-located and/or reference pictures may be utilized in SbTMVP, improved SbTMVP, or TMVP to derive or determine a motion prediction, only one of the multiple co-located pictures may be used at a time, which limits the improved accuracy and efficiency gained my using multiple co-located pictures.

Therefore, to solve the above-mentioned technical problems and deficiencies in related art, embodiments of the present disclosure relate to utilizing one or more overlapping co-located sub-blocks and/or multiple co-located pictures to determine the displacement vector and/or the motion predictor in SbTMVP, improved SbTMVP, or TMVP.

It may be understood that the methods and processes disclosed herein may not be limited to SbTMVP, improved SbTMVP, or TMVP, but may also be expanded for use in other techniques for motion vector prediction.

According to an embodiment of the present disclosure, to derive the motion vector predictor for one or multiple sub-blocks of a current coding block, when fetching the motion vector from another sub-block in the co-located picture using a displacement vector, multiple motion vectors may be fetched, and the final motion vector predictor may be derived based on those multiple motion vectors.

According to an aspect of the present disclosure, to derive the motion vector predictor for one or multiple sub-blocks of the current coding block, when fetching the motion vector from another sub-block in the co-located picture identified by a displacement vector, multiple motion vectors may be fetched, and the final prediction block for the current sub-block may be derived using weighted average of multiple prediction blocks associated with the multiple motion vectors that have been fetched.

It may be understood that the methods and processes disclosed herein may be extended to to multiple co-located pictures, by extending the said overlapped sub-blocks in motion field from one co-located picture to multiple co-located pictures.

Inter Prediction in VVC

For each inter-predicted coding unit (CU), motion parameters may consist of motion vectors, reference picture indices and reference picture list usage index, and additional information needed for the new coding feature of VVC to be used for inter-predicted sample generation. The motion parameters may be signaled in an explicit or implicit manner. When a CU is coded with skip mode, the CU may be associated with one PU and may have no significant residual coefficients, no coded motion vector delta or reference picture index. A merge mode may be specified whereby the motion parameters for the current CU are obtained from neighboring CUs, including spatial and temporal candidates, and additional schedules introduced in VVC. The merge mode may be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Extended Merge Prediction

In VTM4, the merge candidate list is constructed by including the following five types of candidates in order— (1) Spatial MVP from spatial neighbour CUs; (2) Temporal MVP from co-located CUs; (3) History-based MVP from an FIFO table; (4) Pairwise average MVP; and (5) Zero MVs. The size of merge list may be signalled in slice header and the maximum allowed size of merge list may be 6 in VTM4. For each CU code in merge mode, an index of best merge candidate is encoded using truncated unary binarization (TU). The first bin of the merge index is coded with context and bypass coding is used for other bins.

Spatial Candidate Derivation

Figure 1B:
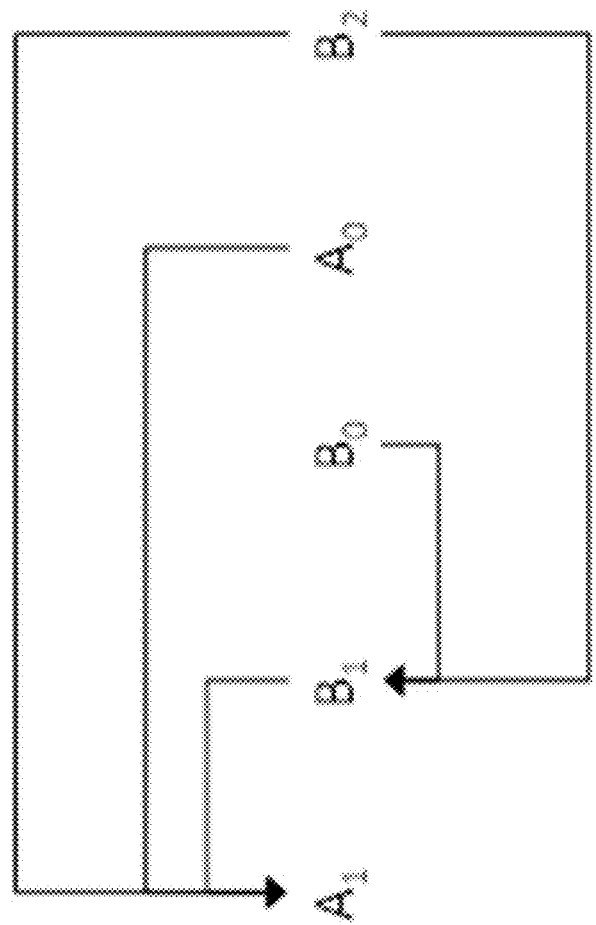
FIG. 1B illustrates examples of candidate pairs considered for redundancy check of spatial merge candidates, according to an embodiment of the present disclosure

The derivation of spatial merge candidates in VVC is similar to that in HEVC. A maximum of four merge candidates may be selected among candidates. FIG. 1A illustrates a current block 1100 indicating exemplary positions of merge candidates $B_1$, $A_1$, $B_0$, $A_0$, and $B_2$. In some embodiments, the order of derivation may be $B_1$, $A_1$, $B_0$, $A_0$, and $B_2$. Position $B_2$ may be considered only when any CU of position $A_0$, $B_0$, $B_1$, $A_1$ is not available (e.g. because it belongs to another slice or tile) or is intra coded. After candidate at position $A_1$ is added, the addition of the remaining candidates may be subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow as shown in FIG. 1B may be considered and a candidate may only added to the list if the corresponding candidate used for redundancy check has not the same motion information.

Temporal Candidate Derivation

Figure 1C:
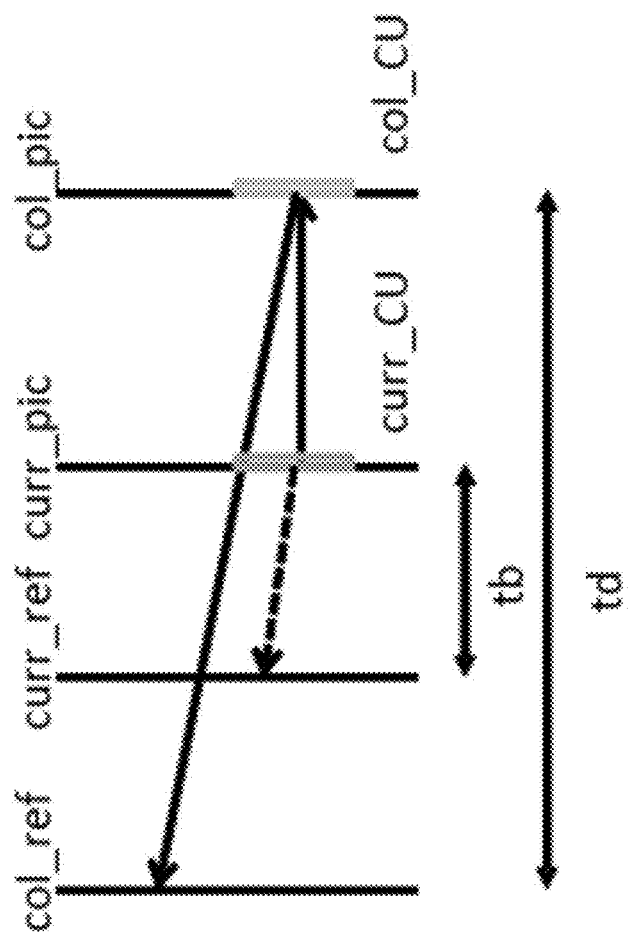
FIG. 1C illustrates an example of motion vector scaling for temporal merge candidate, according to an embodiment of the present disclosure.

In some embodiments, when deriving temporal candidates, only one candidate may be added to the list. Particularly, in the derivation of a temporal merge candidate, a scaled motion vector may be derived based on co-located CU belonging to the co-located reference picture. The reference picture list to be used for derivation of the co-located CU may be explicitly signaled in the slice header. The scaled motion vector for temporal merge candidate may be obtained as illustrated in FIG. 1C, and may be scaled from the motion vector of the co-located CU. As shown in FIG. 1C, the scaled motion vector for temporal merge candidate may be obtained and scaled from the motion vector of the co-located CU based on Picture Order Count (POC) distances tb and td, with tb being the POC difference between the reference picture of the current picture and the current picture, and td being the POC difference between the reference picture of the co-located picture and the co-located picture. The reference picture index of temporal merge candidate may be set equal to zero.

Figure 1D:
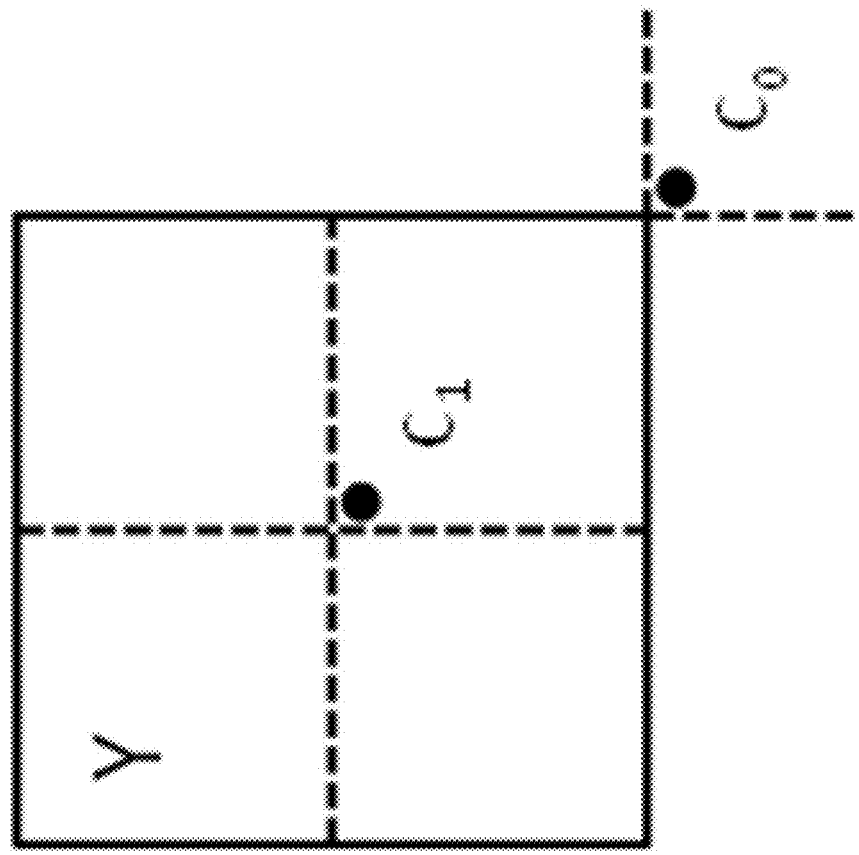
FIG. 1D illustrates examples of positions for temporal merge candidates, according to an embodiment of the present disclosure.

As shown in FIG. 1D, the position for the temporal candidate is selected between candidates $C_0$ and $C_1$. In some embodiments, if CU at position $C_0$ is not available, is intra coded, or is outside of the current row of Coding Tree Units (CTUs), position $C_1$ may be used. Otherwise, position $C_0$ may be used in the derivation of the temporal merge candidate.

Merge with Motion Vector Difference (MMVD)

Figure 1E:
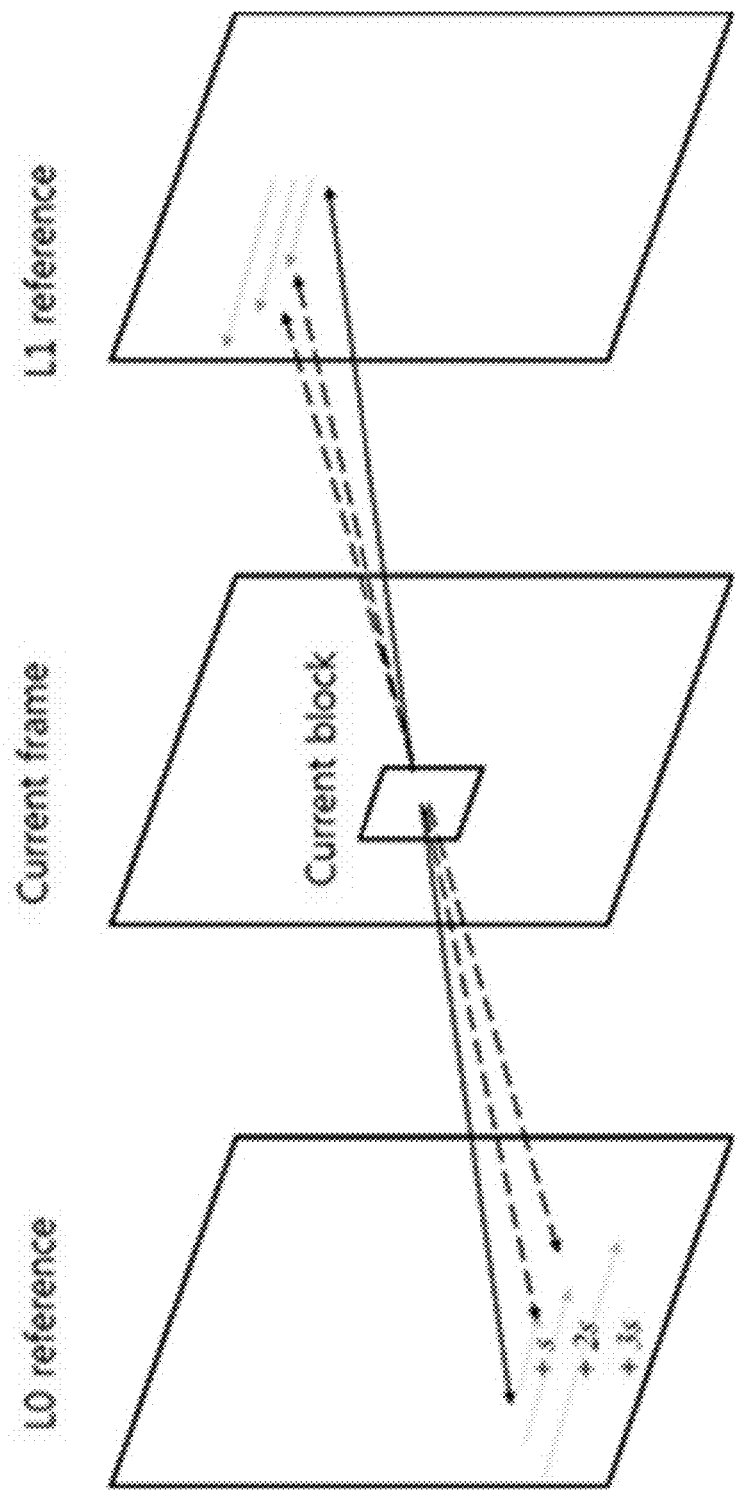
FIG. 1E illustrates an example process for merge with motion vector difference (MMVD) search, according to an embodiment of the present disclosure.

Merge with MMVD may be used for either skip or merge modes with a motion vector expression method. MMVD may re-use merge candidates in VVC. Among the merge candidates, a candidate can be selected, and may further expanded by the proposed motion vector expression method as shown in FIG. 1E and FIG. 1F. MMVD may provide a new motion vector expression with simplified signaling. The expression method may include starting point, motion magnitude, and motion direction.

MMVD technique may use a merge candidate list in VVC. But only candidates which are default merge type (MRG_TYPE_DEFAULT_N) may be considered for MMVD's expansion. Base candidate index defines the starting point. Base candidate index indicates the best candidate among candidates in the list as indicated in Table 1 herein.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate DX may not be signaled. Distance index is motion magnitude information. Distance index indicates the predefined distance from the starting point information. Predefined distance may be as indicated in Table 2 herein.

TABLE 2

| Distance IDX | | | | | | | | |
|---|---|---|---|---|---|---|---|---|
| | Distance IDX | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index may represent the direction of the MMVD relative to the starting point. The direction index can represent of the four directions as shown bin Table 3 herein.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

In some embodiments, MMVD flag may be singnaled right after sending a skip flag and merge flag. If skip and merge flag are true, MMVD flag is parsed. If MMVD flage is equal to 1, MMVD syntaxes are parsed. But, if not 1, AFFINE flag is parsed. If AFFINE flag is equal to 1, that is AFFINE mode, but, if not 1, skip/merge index is parsed for VTM's skip/merge mode.

Template Matching based candidate reordering on MMVD and Affine MMVD

Figure 1G:
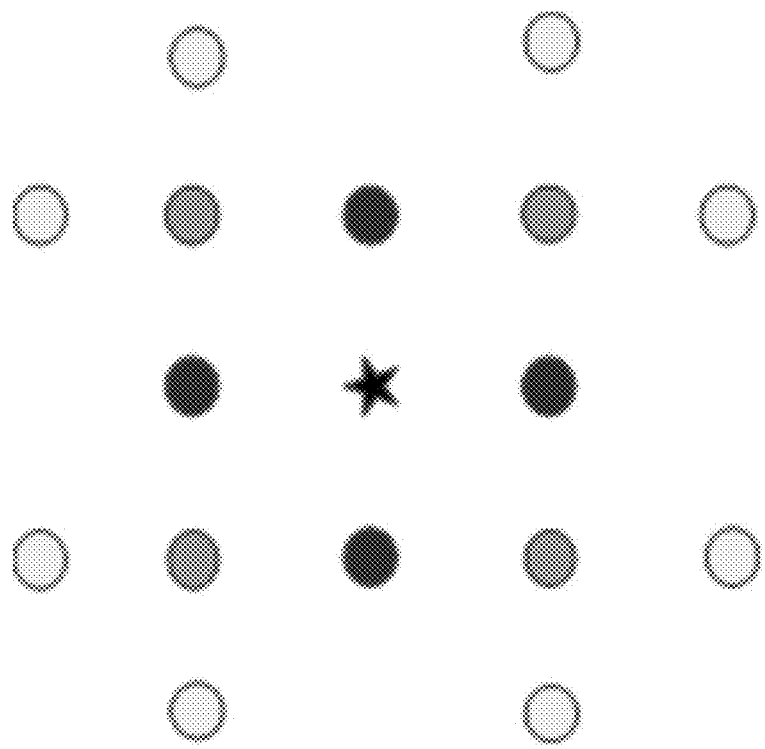
FIG. 1G illustrates example additional directions along diagonal angles, according to an embodiment of the present disclosure.

In related art, MMVD offsets may be extended for MMVD and affine MMVD modes. Additional refinement positions along k×π/8 diagonal angles may be added shown in FIG. 1G, thus increasing the number of directions from 4 to 16. In addition, based on the sum of absolute different (SAD) cost between the template (one row above and one column left to the current block) and its reference for each refinement position, all the possible MMVD refinement positions (16×6) for each base candidate may be reordered. In some embodiments, the top ⅛ refinement positions with the smallest template SAD costs are kept as available positions, consequently for MMVD index coding. The MMVD index may be binarized by the rice code with the parameter equal to 2.

In an aspect of the present disclosure, on top of the MMVD extension as described herein, affine MMVD reordering may also be extended, in which additional refinement positions along k×π/4 diagonal angles may be added. After reordering top ½ refinement positions with the smallest template SAD costs may be kept.

Subblock-Based TMVP (SbTMVP)

To improve the coding efficiency and reduce the transmission overhead of motion vector, the sub-block level motion vector refinement may be applied to extend the CU level temporal motion vector prediction (TMVP). The sub-block-based TMVP (SbTMVP) allows inheriting the motion information at subblock-level from the co-located reference picture. Each sub-block of a large size CU may have its own motion information without explicitly transmitting the block partition structure or motion information. SbTMVP may obtain motion information for each sub-block as follows. Firstly, SbTMVP may include the derivation of displacement vector (DV) of the current CU. And then, based on the availability of the SbTMVP candidate, derive the central motion. Finally, SbTMVP may include deriving the sub-block motion information from the corresponding sub-block by the DV. Unlike TMVP candidate derivation which always derives the temporal motion vectors from the co-located block in the reference frame, SbTMVP may apply a DV which is derived from the motion vector (MV) of the left neighboring CU of the current CU to find the corresponding sub-block in the co-located picture for each sub-block of the current CU. In case the corresponding sub-block is not inter-coded, the motion information of the current sub-block may be set to be the central motion.

VVC supports the sub-block-based temporal motion vector prediction (SbTMVP) method. Similar to the temporal motion vector prediction (TMVP) in HEVC, SbTMVP uses the motion field in the co-located picture to improve motion vector prediction and merge mode for CUs in the current picture. The same co-located picture used by TMVP is used for SbTMVP. SbTMVP differs from TMVP in the following two main aspects:

(1) TMVP predicts motion at CU level but SbTMVP predicts motion at sub-CU level; and (2) while TMVP fetches the temporal motion vectors from the co-located block in the co-located picture (the co-located block is the bottom-right or center block relative to the current CU), SbTMVP applies a motion shift before fetching the temporal motion information from the co-located picture, where the motion shift (also referred to as displacement vector or DV) is obtained from the motion vector from one of the spatial neighboring blocks of the current CU.

Figure 1H:
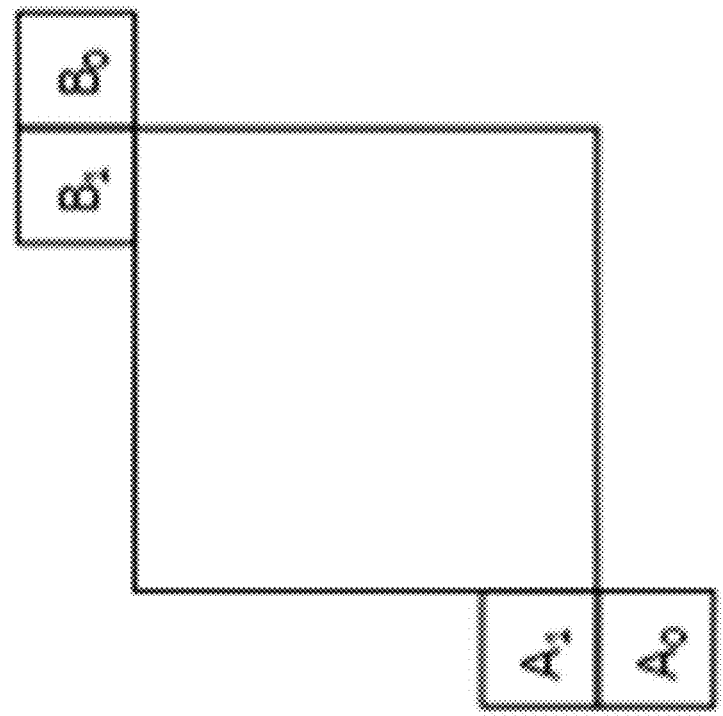
FIG. 1H illustrates exemplary spatial neighboring blocks used by ATVMP, according to an embodiment of the present disclosure.

FIG. 1H illustrates an exemplary SbTMVP candidate selection using spatial neighboring blocks. SbTMVP predicts the motion vectors of the sub-CUs within the current CU in two parts. As a first part, the spatial neighbor $A_1$ in FIG. 1H is examined. If $A_1$ has a motion vector that uses the co-located picture as its reference picture, this motion vector is selected to be the motion shift (or displacement vector) to be applied. If no such motion is identified, then the motion shift is set to (0, 0).

Figure 1I:
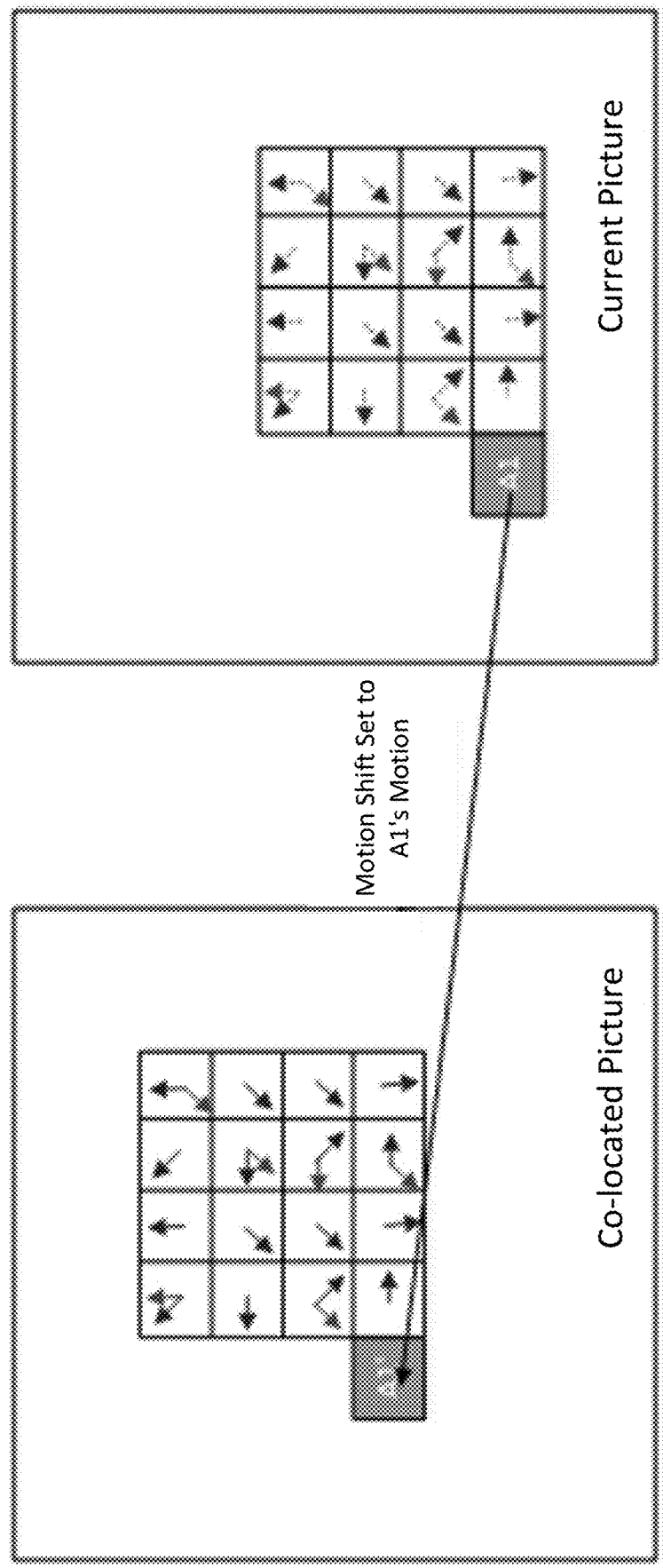
FIG. 1I illustrates an example process for deriving sub-CU motion field based on a motion shift from spatial neighbors, according to an embodiment of the present disclosure.

As a second part, the motion shift identified in part one may be applied (i.e. added to the current block's coordinates) to obtain sub-CU-level motion information (motion vectors and reference indices) from the co-located picture as shown in FIG. 1I. As shown in FIG. 1I, an assumption is made that the motion shift is set to block $A_1$'s motion. Then, for each sub-CU, the motion information of its corresponding block (the smallest motion grid that covers the center sample) in the co-located picture is used to derive the motion information for the sub-CU. After the motion information of the co-located sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined sub-block based merge list which contains both SbTMVP candidate and affine merge candidates is used for the signaling of sub-block based merge mode. The SbTMVP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signaled in SPS and the maximum allowed size of the sub-block based merge list is 5 in VVC.

In VVC, the sub-CU size used in SbTMVP is fixed to be 8×8, and as done for affine merge mode, SbTMVP mode is only applicable to the CU with both width and height are larger than or equal to 8. The sub-block size may be configurable to other sizes, such as 4×4, in the ECM software model use for exploration beyond VVC. Two co-located frames are proposed and utilized to provide the temporal motion information for SbTMVP and TMVP in AMVP mode.

Subblock-Based TMVP with Motion Vector Offset

To get the best matching, an extra motion vector offset (MVO) was previously added to displacement motion vector (DV). By using the MVO(xo, yo), the location of the MV field within the co-located CU could be adjusted. When the MVO(xo, yo) is not a zero motion offset, the DV', which is the addition of DV and MVO, is used as the displacement vector to indicate the location of co-located CU to derive the subblock-level temporal motion vector prediction (SbTMVP). Moreover, template-matching (TM) method was also proposed, in which the displacement vector (DV) of the SbTMVP is used as motion vector for the template-matching process.

As stated above, in the context of SbTMVP, improved SbTMVP, or TMVP, the displacement vector used for deriving or determining the motion vector of the current block may overlap with multiple sub-blocks in the reference picture. However, only the motion vector associated with one sub-block may be considered or used as the predictor in SbTMVP, improved SbTMVP, or TMVP. This using of just one motion vector when multiple relevant motion vectors are available for determining the predictor is not optimal and often results in errors.

Furthermore, while multiple co-located and/or reference pictures may be utilized in SbTMVP, improved SbTMVP, or TMVP to derive or determine a motion prediction, only one of the multiple co-located pictures may be used at a time, which limits the improved accuracy and efficiency gained my using multiple co-located pictures.

Therefore, to solve the above-mentioned technical problems and deficiencies in related art, embodiments of the present disclosure relate to utilizing one or more overlapping co-located sub-blocks and/or multiple co-located pictures to determine the displacement vector and/or the motion predictor in SbTMVP, improved SbTMVP, or TMVP.

According to an embodiment of the present disclosure, to derive the motion vector predictor for one or multiple sub-blocks of a current coding block, when fetching the motion vector from another sub-block in the co-located picture using a displacement vector, multiple motion vectors may be fetched, and the final motion vector predictor may be derived based on those multiple motion vectors.

In an embodiment, for one sub-block of current prediction block (namely sub-block T), a DV may first be derived, which is used to identify another sub-block (namely sub-block T') located in the co-located picture. If the identified sub-block T' overlaps the motion field grid (e.g., 4×4 or 8×8) in the co-located picture, i.e., the identified sub-block overlaps with multiple sub-blocks that are storing separate motion information in co-located picture, multiple motion vectors that are associated with the overlapped sub-blocks may be fetched and used to derive the final motion vector predictor for the current sub-block of current prediction block. A motion vector field may be a collection of motion vectors associated with sub-blocks of in a picture.

Figure 2:
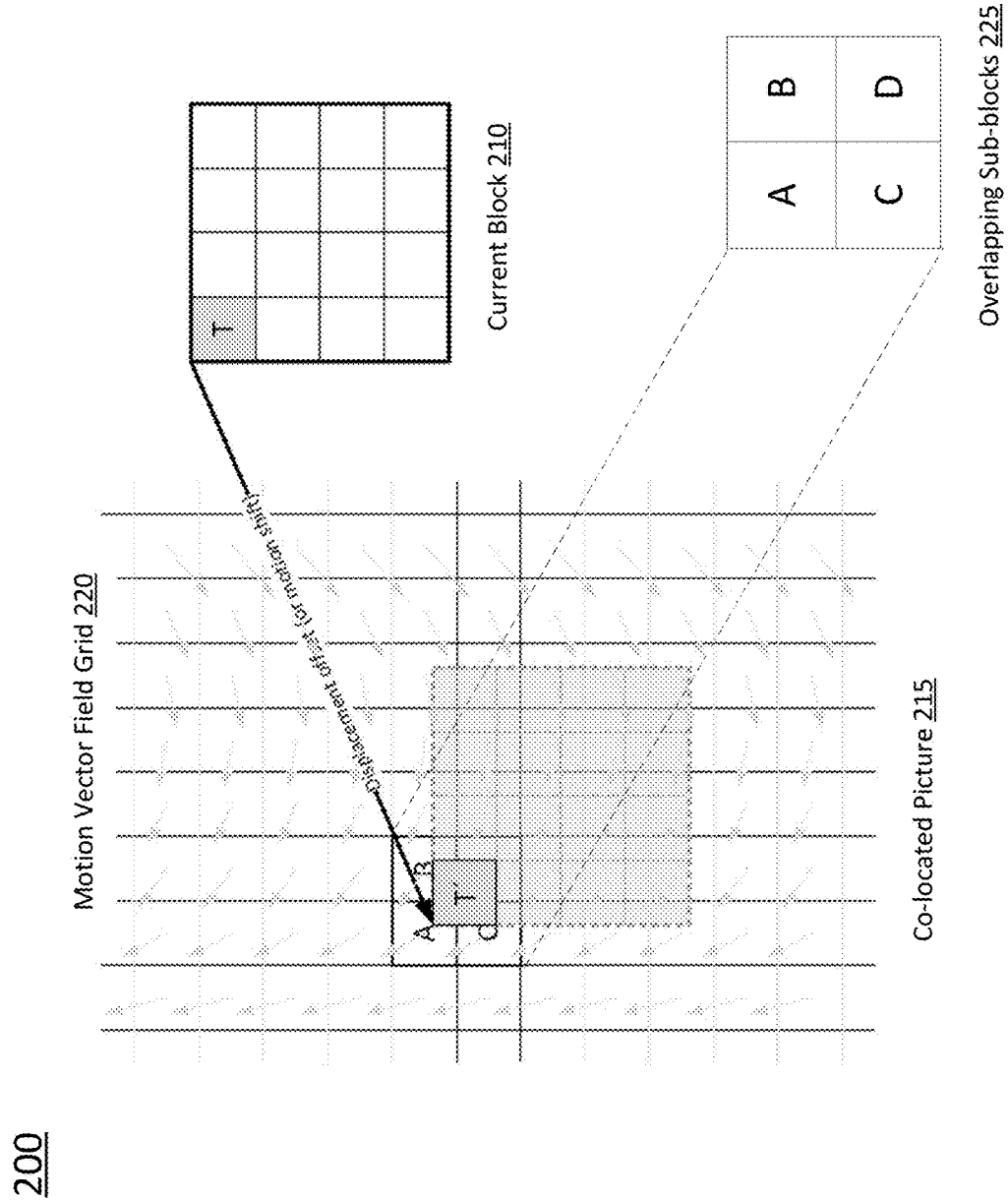
FIG. 2 illustrates an example of a sub-block overlapping the motion vector field grid in co-located picture, according to an embodiment of the present disclosure.

As an example, referring to FIG. 2, the identified sub-block T' in the co-located picture (may be a co-located block in some embodiments) 215 overlaps with four sub-blocks A, B, C and D (overlapping sub-blocks 225) in the co-located picture 215 aligned with the motion vector field grid 220. As another example, referring to FIG. 3, the identified sub-block T' overlaps with nine sub-blocks A, B, C, D, E, F, G, H and I (overlapping sub-blocks 325) in the co-located picture (may be referred to as a co-located block in some embodiments) 315 aligned with the motion vector field grid 320.

In an embodiment of the present disclosure, the motion vector associated with the sub-block, which overlaps most with the area of sub-block T', may be used as the final MVP of sub-block Tin SbTMVP. An example, referring to FIG. 2, where T' overlaps with sub-block D most, then the motion information associated with sub-block D may be used as the MVP of sub-block Tin SbTMVP.

In an embodiment of the present disclosure, the weighted average of the motion vectors associated with multiple sub-blocks, which overlap with the sub-block T', may be used as the final MVP of sub-block Tin SbTMVP. An example, referring to FIG. 2, T' overlaps with A, B, C and D in the co-located picture aligned with the motion vector field grid, then the weighted average of motion vector associated with A, B, C and D may be derived as the MVP of sub-block Tin SbTMVP. In some embodiments, the weightings in the weighted average may depend on how much area is overlapped between the associated sub-block in co-located picture and the sub-block T'. In some embodiments, the weightings in the weighted average may depend on the distance between the center pixel position of T' and the center position of the generated motion vector predictor A, B, C or D. In some embodiments, when an overlapped sub-block in the co-located picture has MV pointing to out of picture boundary, the MV may be excluded in the weighted averaging process.

In an embodiment of the present disclosure, the motion vector associated with the sub-block, which overlaps with the center point position of sub-block T', may be used as the final MVP of sub-block T in SbTMVP. An example, referring to FIG. 2, the center point of T' overlaps with sub-block D, then the motion information associated with sub-block D may be used as the MVP of sub-block T in SbTMVP.

According to an aspect of the present disclosure, to derive the motion vector predictor for one or multiple sub-blocks of the current coding block, when fetching the motion vector from another sub-block in the co-located picture identified by a displacement vector, multiple motion vectors may be fetched, and the final prediction block for the current sub-block may be derived using weighted average of multiple prediction blocks associated with the multiple motion vectors that have been fetched.

In an embodiment, for one sub-block of current prediction block (namely sub-block T), a DV may first be derived, which may be used to identify another sub-block (namely sub-block T') located in the co-located picture. If the identified sub-block overlaps the motion field grid (e.g., 4×4 or 8×8) in the co-located picture, i.e., the identified sub-block overlaps with multiple sub-blocks that are storing separate motion information in co-located picture, multiple prediction blocks generated by the motion vectors that are associated with the overlapped sub-blocks are generated and the final prediction block for the current sub-block is generated as weighted average of those multiple prediction blocks. As an example, referring to FIG. 2, where the identified sub-block overlaps with four sub-blocks A, B, C and D (overlapping sub-blocks 225) in the co-located picture 215 aligned with the motion vector field grid 220, four prediction blocks may be generated using the motion vector associated with A, B, C and D, then the final prediction block of sub-block Tis generated as the weighted average of the said four prediction blocks. In some embodiments, the weighting depends on how much area may be overlapped between the associated sub-block in co-located picture and the sub-block T'. In some embodiments, each pixel in sub-block has its corresponding weighting average of the generated motion vector predictors from A, B, C and D. In some embodiments, the corresponding weighting average may be derived from the distance between the pixel position and the center position of the generated motion vector predictor A, B, C or D.

In an embodiment, when an overlapped sub-block in the co-located picture has MV pointing to out of picture boundary, the prediction from its MV may be excluded in the weighted averaging process.

It may be understood that methods and processes described herein may be extended to multiple co-located pictures, by extending the said overlapped sub-blocks in motion field from one co-located picture to multiple co-located pictures.

Figure 4:
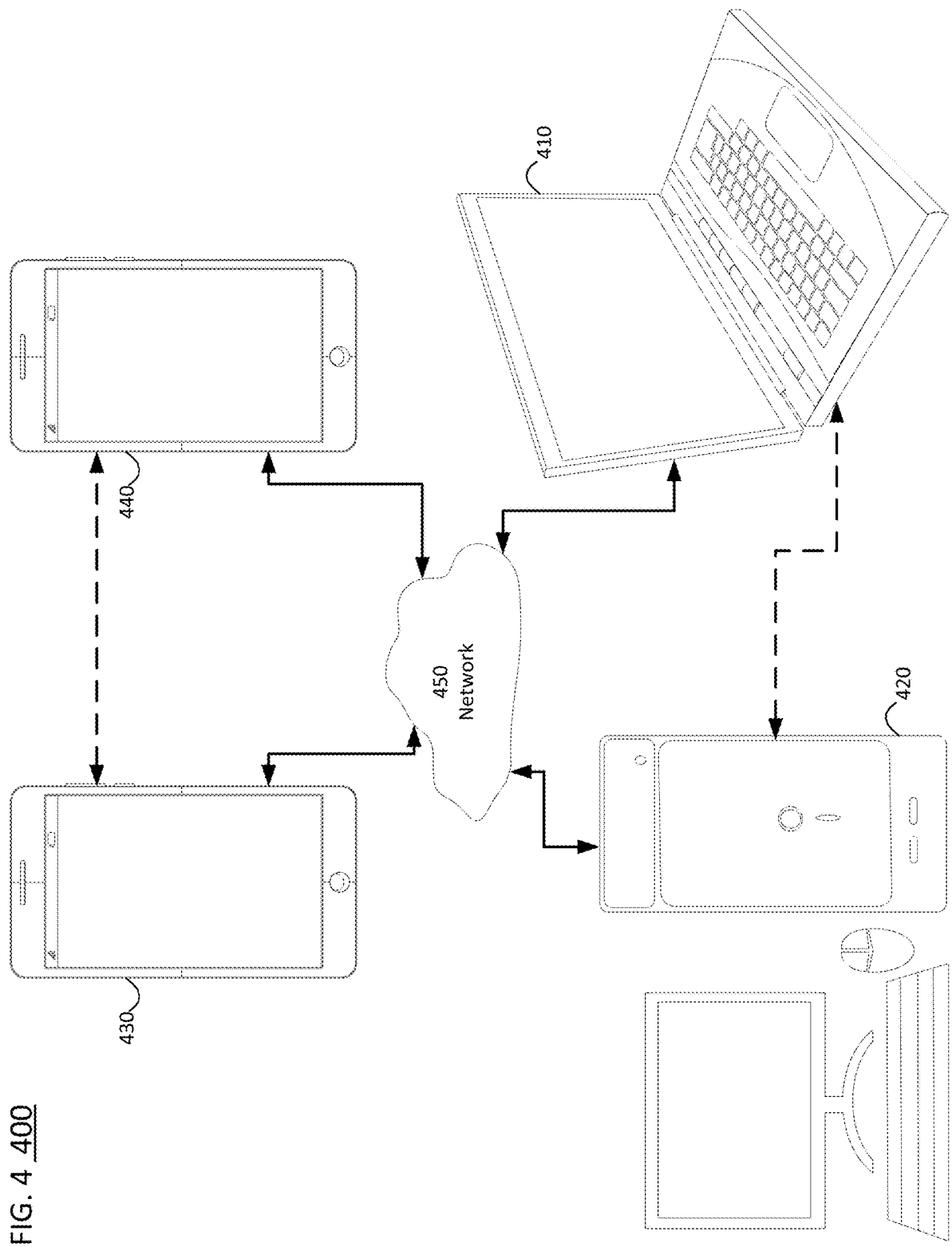
FIG. 4 is a simplified block diagram of a communication system, according to an embodiment of the present disclosure.

FIG. 4 illustrates a simplified block diagram of a communication system 400 according to an embodiment of the present disclosure. The communication system 400 may include at least two terminals 410-420 interconnected via a network 450. For unidirectional transmission of data, a first terminal 410 may code video data at a local location for transmission to the second terminal 420 via the network 450. The second terminal 420 may receive the coded video data of the other terminal from the network 450, decode the coded data, and display the recovered video data. Unidirectional data transmission may be common in media serving applications and the like.

FIG. 4 illustrates a second pair of terminals 430, 440 provided to support bidirectional transmission of coded video that may occur, for example, during videoconferencing. For bidirectional transmission of data, each terminal 430, 440 may code video data captured at a local location for transmission to the other terminal via the network 450. Each terminal 430, 440 also may receive the coded video data transmitted by the other terminal, may decode the coded data and may display the recovered video data at a local display device.

In FIG. 4, the terminals 410-440 may be illustrated as servers, personal computers and smart phones but the principles of the present disclosure are not so limited. Embodiments of the present disclosure find application with laptop computers, tablet computers, media players and/or dedicated video conferencing equipment. The network 450 represents any number of networks that convey coded video data among the terminals 410-440, including for example wireline and/or wireless communication networks. The communication network 450 may exchange data in circuit-switched and/or packet-switched channels. Representative networks include telecommunications networks, local area networks, wide area networks, and/or the Internet. For the purposes of the present discussion, the architecture and topology of the network 450 may be immaterial to the operation of the present disclosure unless explained herein below.

Figure 5:
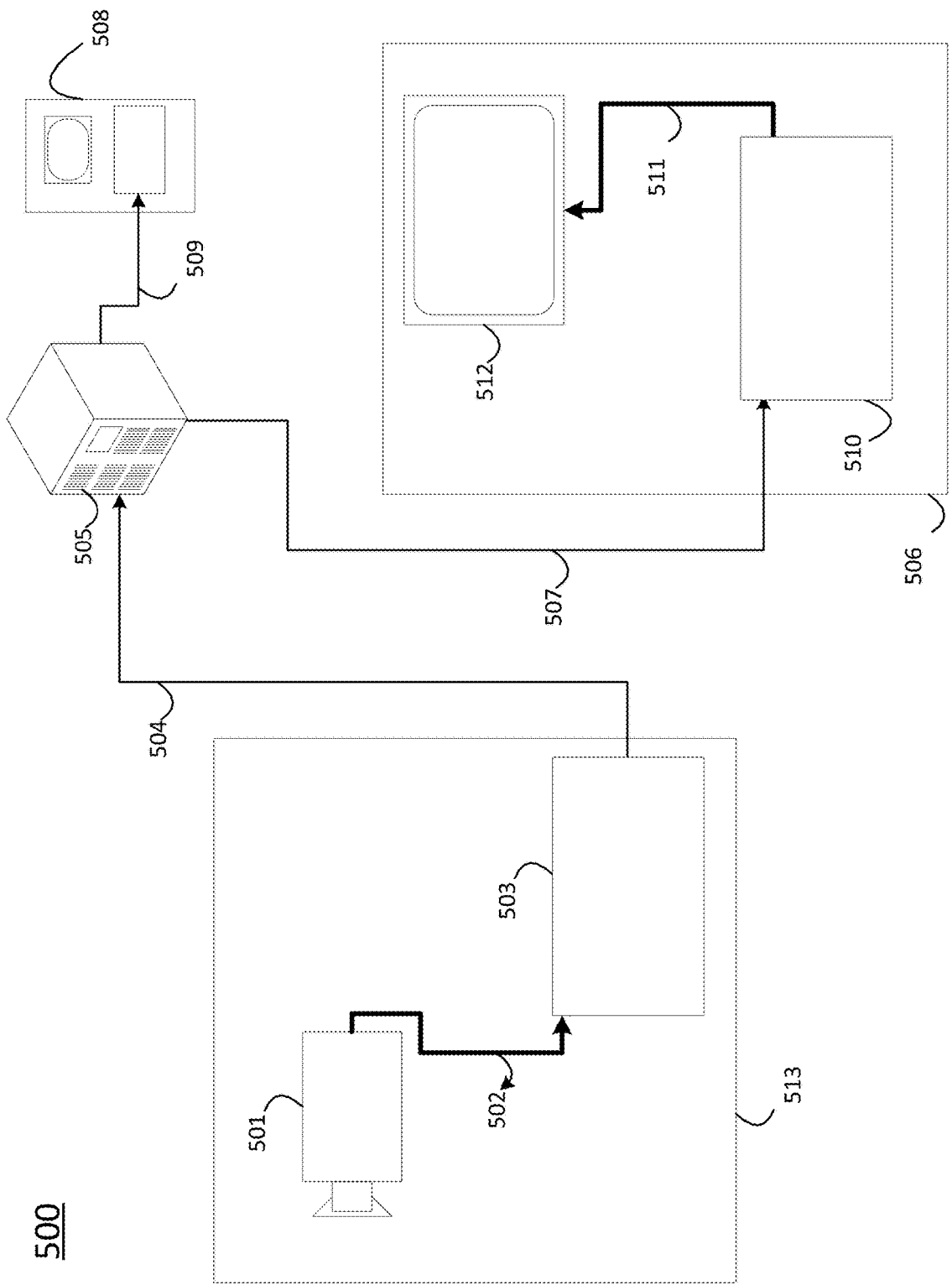
FIG. 5 is a diagram of the placement of a video encoder and decoder in a streaming environment.

FIG. 5 illustrates, as an example for an application for the disclosed subject matter, the placement of a video encoder and decoder in a streaming environment, for example streaming system 500. The disclosed subject matter can be equally applicable to other video enabled applications, including, for example, video conferencing, digital TV, storing of compressed video on digital media including CD, DVD, memory stick and the like, and so on.

A streaming system may include a capture subsystem 513, which can include a video source 501, for example a digital camera, creating, for example, an uncompressed video sample stream 502. That sample stream 502, depicted as a bold line to emphasize a high data volume when compared to encoded video bitstreams, can be processed by an encoder 503 coupled to the video source 501, which may be for example a camera. The encoder 503 can include hardware, software, or a combination thereof to enable or implement aspects of the disclosed subject matter as described in more detail below. The encoded video bitstream 504, depicted as a thin line to emphasize the lower data volume when compared to the sample stream, can be stored on a streaming server 505 for future use. One or more streaming clients 506, 508 can access the streaming server 505 to retrieve video bitstreams 507, 509, which may be for example copies of the encoded video bitstream 504. A client 506 can include a video decoder 510, which decodes the incoming copy of the encoded video bitstream 507 and creates an outgoing video sample stream 511 that can be rendered on a display 512 or other rendering device not depicted. In some streaming systems, the video bitstreams 504, 507, 509 can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
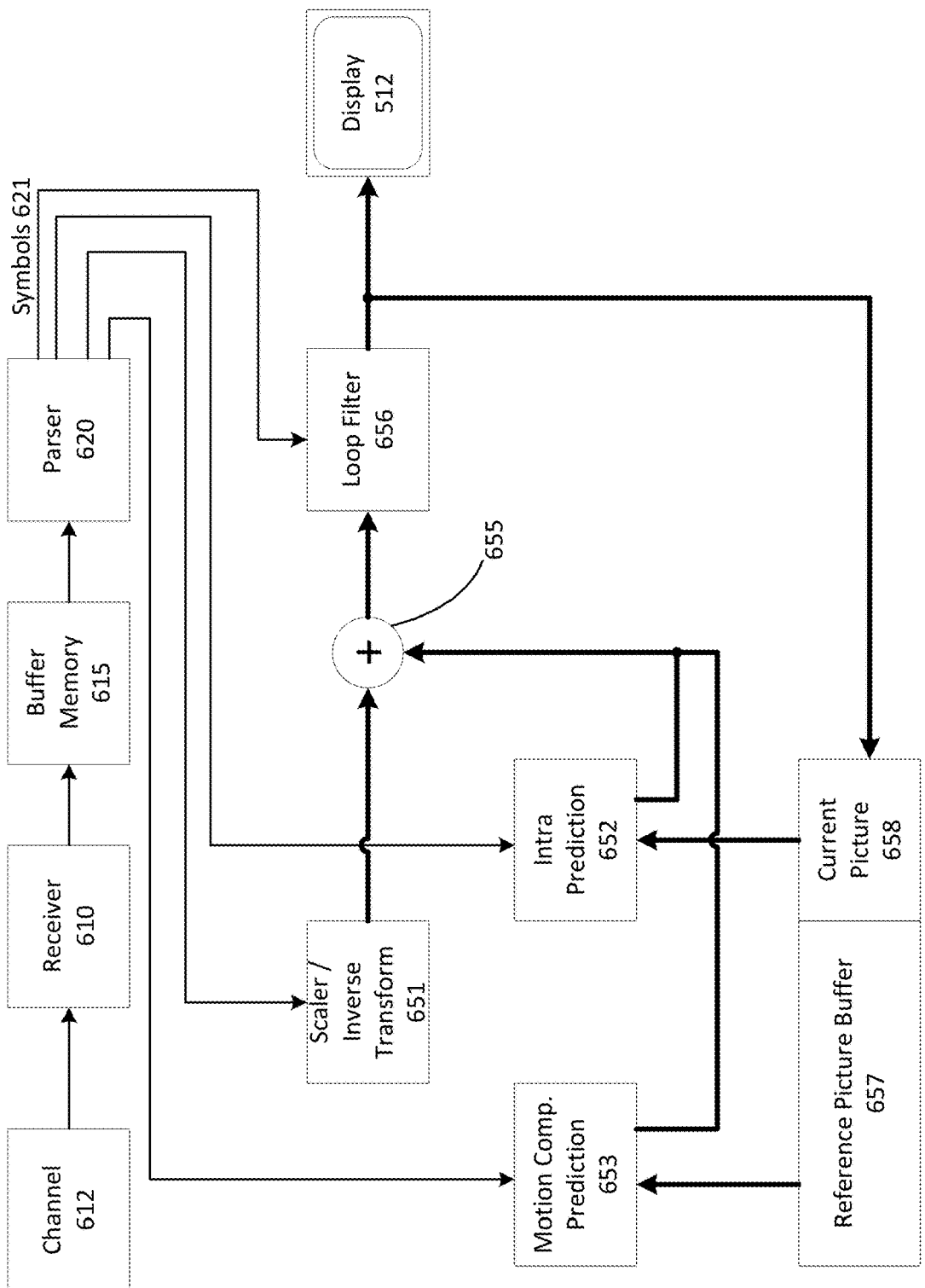
FIG. 6 is a functional block diagram of a video decoder, according to an embodiment of the present disclosure.

FIG. 6 may be a functional block diagram of a video decoder 510 according to an embodiment of the present disclosure.

A receiver 610 may receive one or more codec video sequences to be decoded by the decoder 510; in the same or another embodiment, one coded video sequence at a time, where the decoding of each coded video sequence is independent from other coded video sequences. The coded video sequence may be received from a channel 612, which may be a hardware/software link to a storage device, that stores the encoded video data. The receiver 610 may receive the encoded video data with other data, for example, coded audio data, and/or ancillary data streams, that may be forwarded to their respective using entities not depicted. The receiver 610 may separate the coded video sequence from the other data. To combat network jitter, a buffer 615, which may be for example a buffer memory, may be coupled in between receiver 610 and entropy decoder/parser 620 "parser" henceforth. When receiver 610 is receiving data from a store/forward device of sufficient bandwidth and controllability, or from an isosynchronous network, the buffer 615 may not be needed, or can be small. For use on best effort packet networks such as the Internet, the buffer 615 may be required, can be comparatively large, and can advantageously of adaptive size.

The video decoder 510 may include a parser 620 to reconstruct symbols 621 from the entropy coded video sequence. Categories of those symbols include information used to manage operation of the decoder 510, and potentially information to control a rendering device such as a display 512 that is not an integral part of the decoder but can be coupled to it, as was shown in FIG. 6. The control information for the rendering device(s may be in the form of Supplementary Enhancement Information SEI messages or Video Usability Information (VUI) parameter set fragments not depicted. The parser 620 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 620 may extract from the coded video sequence, a set of subgroup parameters for at least one of the subgroups of pixels in the video decoder, based upon at least one parameters corresponding to the group. Subgroups can include Groups of Pictures GOPs, pictures, tiles, slices, macroblocks, Coding Units CUs, blocks, Transform Units TUs, Prediction Units PUs and so forth. The entropy decoder/parser may also extract from the coded video sequence information such as transform coefficients, quantizer parameter QP values, motion vectors, and so forth.

The parser 620 may perform entropy decoding/parsing operation on the video sequence received from the buffer 615, so to create symbols 621. The parser 620 may receive encoded data, and selectively decode particular symbols 621. Further, the parser 620 may determine whether the particular symbols 621 are to be provided to a Motion Compensation Prediction unit 653, a scaler/inverse transform unit 651, an Intra Prediction Unit 652, or a loop filter unit 656.

Reconstruction of the symbols 621 can involve multiple different units depending on the type of the coded video picture or parts thereof such as inter and intra picture, inter and intra block, and other factors. Which units are involved, and how, can be controlled by the subgroup control information that was parsed from the coded video sequence by the parser 620. The flow of such subgroup control information between the parser 620 and the multiple units below is not depicted for clarity.

Beyond the functional blocks already mentioned, decoder 510 can be conceptually subdivided into a number of functional units as described below. In a practical implementation operating under commercial constraints, many of these units interact closely with each other and can, at least partly, be integrated into each other. However, for describing the disclosed subject matter, the conceptual subdivision into the functional units below is appropriate.

A first unit is the scaler/inverse transform unit 651. The scaler/inverse transform unit 651 receives quantized transform coefficient as well as control information, including which transform to use, block size, quantization factor, quantization scaling matrices, etc. as symbol(s 621 from the parser 620. It can output blocks comprising sample values that can be input into aggregator 655.

In some cases, the output samples of the scaler/inverse transform unit 651 can pertain to an intra coded block; that is: a block that is not using predictive information from previously reconstructed pictures, but can use predictive information from previously reconstructed parts of the current picture. An intra picture prediction unit 652 can provide such predictive information. In some cases, the intra picture prediction unit 652 generates a block of the same size and shape of the block under reconstruction, using surrounding already reconstructed information fetched from the current partly reconstructed picture 658. The aggregator 655, in some cases, adds, on a per sample basis, the prediction information the intra prediction unit 652 has generated to the output sample information as provided by the scaler/inverse transform unit 651.

In other cases, the output samples of the scaler/inverse transform unit 651 can pertain to an inter coded, and potentially motion compensated block. In such a case, a Motion Compensation Prediction unit 653 can access reference picture memory 657 to fetch samples used for prediction. After motion compensating the fetched samples in accordance with the symbols, the aggregator 655 to the output of the scaler/inverse can add 621 pertaining to the block, these samples transform unit in this case called the residual samples or residual signal so to generate output sample information. The addresses within the reference picture memory form where the motion compensation unit fetches prediction samples can be controlled by motion vectors, available to the motion compensation unit in the form of symbols 621 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 655 can be subject to various loop-filtering techniques in the loop filter unit 656. Video compression technologies can include in-loop filter technologies that are controlled by parameters included in the coded video bitstream and made available to the loop filter unit 656 as symbols 621 from the parser 620, but can also be responsive to meta-information obtained during the decoding of previous in decoding order parts of the coded picture or coded video sequence, as well as responsive to previously reconstructed and loop-filtered sample values.

The output of the loop filter unit 656 can be a sample stream that can be output to the display 512, which may be for example a render device, as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture by, for example, parser 620), the current reference picture 658 can become part of the reference picture memory 657, which may be for example a reference picture buffer, and a fresh current picture memory can be reallocated before commencing the reconstruction of the following coded picture.

The video decoder 510 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate measured in, for example mega samples per second, maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 610 may receive additional redundant data with the encoded video. The additional data may be included as part of the coded video sequence(s. The additional data may be used by the video decoder 510 to properly decode the data and/or to more accurately reconstruct the original video data. Additional data can be in the form of, for example, temporal, spatial, or signal-to-noise ratio SNR enhancement layers, redundant slices, redundant pictures, forward error correction codes, and so on.

Figure 7:
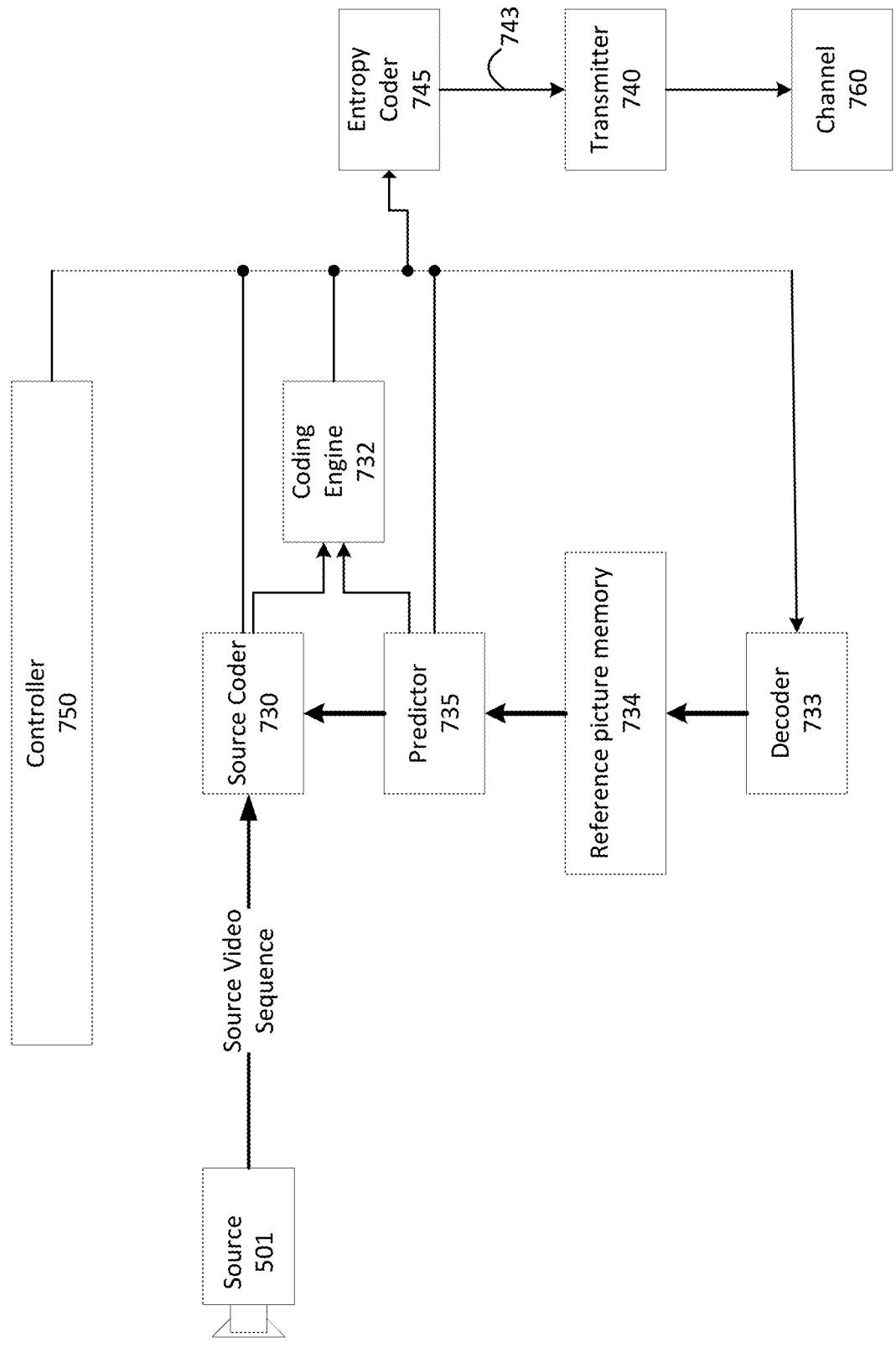
FIG. 7 is a functional block diagram of a video encoder, according to an embodiment of the present disclosure.

FIG. 7 may be a functional block diagram of a video encoder 503 according to an embodiment of the present disclosure.

The encoder 503 may receive video samples from a video source 501 that is not part of the encoder that may capture video images to be coded by the encoder 503.

The video source 501 may provide the source video sequence to be coded by the encoder 503 in the form of a digital video sample stream that can be of any suitable bit depth for example: 8 bit, 10 bit, 12 bit, . . . , any colorspace for example, BT.601 Y CrCB, RGB, . . . and any suitable sampling structure for example Y CrCb 4:2:0, Y CrCb 4:4:4. In a media serving system, the video source 501 may be a storage device storing previously prepared video. In a videoconferencing system, the video source 501 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 503 may code and compress the pictures of the source video sequence into a coded video sequence 743 in real time or under any other time constraints as required by the application. Enforcing appropriate coding speed is one function of Controller 750. Controller controls other functional units as described below and is functionally coupled to these units. The coupling is not depicted for clarity. Parameters set by controller can include rate control related parameters picture skip, quantizer, lambda value of rate-distortion optimization techniques, . . . , picture size, group of pictures GOP layout, maximum motion vector search range, and so forth. A person skilled in the art can readily identify other functions of controller 750 as they may pertain to video encoder 503 optimized for a certain system design.

Some video encoders operate in what a person skilled in the art readily recognizes as a "coding loop." As an oversimplified description, a coding loop can consist of the encoding part of a source coder 730, which may be for example an encoder, henceforth responsible for creating symbols based on an input picture to be coded, and a reference picture(s), and a local decoder 733 embedded in the encoder 503 that reconstructs the symbols to create the sample data that a remote decoder also would create as any compression between symbols and coded video bitstream is lossless in the video compression technologies considered in the disclosed subject matter. That reconstructed sample stream is input to the reference picture memory 734. As the decoding of a symbol stream leads to bit-exact results independent of decoder location local or remote, the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity and resulting drift, if synchronicity cannot be maintained, for example because of channel errors is well known to a person skilled in the art.

The operation of the local decoder 733 can be the same as of a remote decoder 510, which has already been described in detail above in conjunction with FIG. 6. Briefly referring also to FIG. 7, however, as symbols are available and en/decoding of symbols to a coded video sequence by entropy coder 745 and parser 620 can be lossless, the entropy decoding parts of decoder 510, including channel 612, receiver 610, buffer 615, and parser 620 may not be fully implemented in local decoder 733.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 730 may perform motion compensated predictive coding, which codes an input frame predictively with reference to one or more previously-coded frames from the video sequence that were designated as "reference frames." In this manner, the coding engine 732 codes differences between pixel blocks of an input frame and pixel blocks of reference frame(s that may be selected as prediction reference(s to the input frame.

The local video decoder 733 may decode coded video data of frames that may be designated as reference frames, based on symbols created by the source coder 730. Operations of the coding engine 732 may advantageously be lossy processes. When the coded video data may be decoded at a video decoder not shown in FIG. 7, the reconstructed video sequence typically may be a replica of the source video sequence with some errors. The local video decoder 733 replicates decoding processes that may be performed by the video decoder on reference frames and may cause reconstructed reference frames to be stored in the reference picture memory 734, which may be for example a reference picture cache. In this manner, the encoder 503 may store copies of reconstructed reference frames locally that have common content as the reconstructed reference frames that will be obtained by a far-end video decoder absent transmission errors.

The predictor 735 may perform prediction searches for the coding engine 732. That is, for a new frame to be coded, the predictor 735 may search the reference picture memory 734 for sample data as candidate reference pixel blocks or certain metadata such as reference picture motion vectors, block shapes, and so on, that may serve as an appropriate prediction reference for the new pictures. The predictor 735 may operate on a sample block-by-pixel block basis to find appropriate prediction references. In some cases, as determined by search results obtained by the predictor 735, an input picture may have prediction references drawn from multiple reference pictures stored in the reference picture memory 734.

The controller 750 may manage coding operations of the source coder 730, including, for example, setting of parameters and subgroup parameters used for encoding the video data.

Output of all aforementioned functional units may be subjected to entropy coding in the entropy coder 745. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 740 may buffer the coded video sequence(s as created by the entropy coder 745 to prepare it for transmission via a communication channel 760, which may be a hardware/software link to a storage device which would store the encoded video data. The transmitter 740 may merge coded video data from the source coder 730 with other data to be transmitted, for example, coded audio data and/or ancillary data streams sources not shown.

The controller 750 may manage operation of the encoder 503. During coding, the controller 750 may assign to each coded picture a certain coded picture type, which may affect the coding techniques that may be applied to the respective picture. For example, pictures often may be assigned as one of the following frame types:

An Intra Picture I picture may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture P picture may be one that may be coded and decoded using intra prediction or inter prediction using at most one motion vector and reference index to predict the sample values of each block.

A Bi-directionally Predictive Picture B Picture may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks for example, blocks of 4×4, 8×8, 4×8, or 16×16 samples each and coded on a block-by-block basis. Blocks may be coded predictively with reference to other already coded blocks as determined by the coding assignment applied to the blocks' respective pictures. For example, blocks of I pictures may be coded non-predictively or they may be coded predictively with reference to already coded blocks of the same picture spatial prediction or intra prediction. Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 503 may perform coding operations according to a predetermined video coding technology or standard, such as ITU-T Rec. H.265. In its operation, the encoder 503 may perform various compression operations, including predictive coding operations that exploit temporal and spatial redundancies in the input video sequence. The coded video data, therefore, may conform to a syntax specified by the video coding technology or standard being used.

In an embodiment, the transmitter 740 may transmit additional data with the encoded video. The source coder 730 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 8:
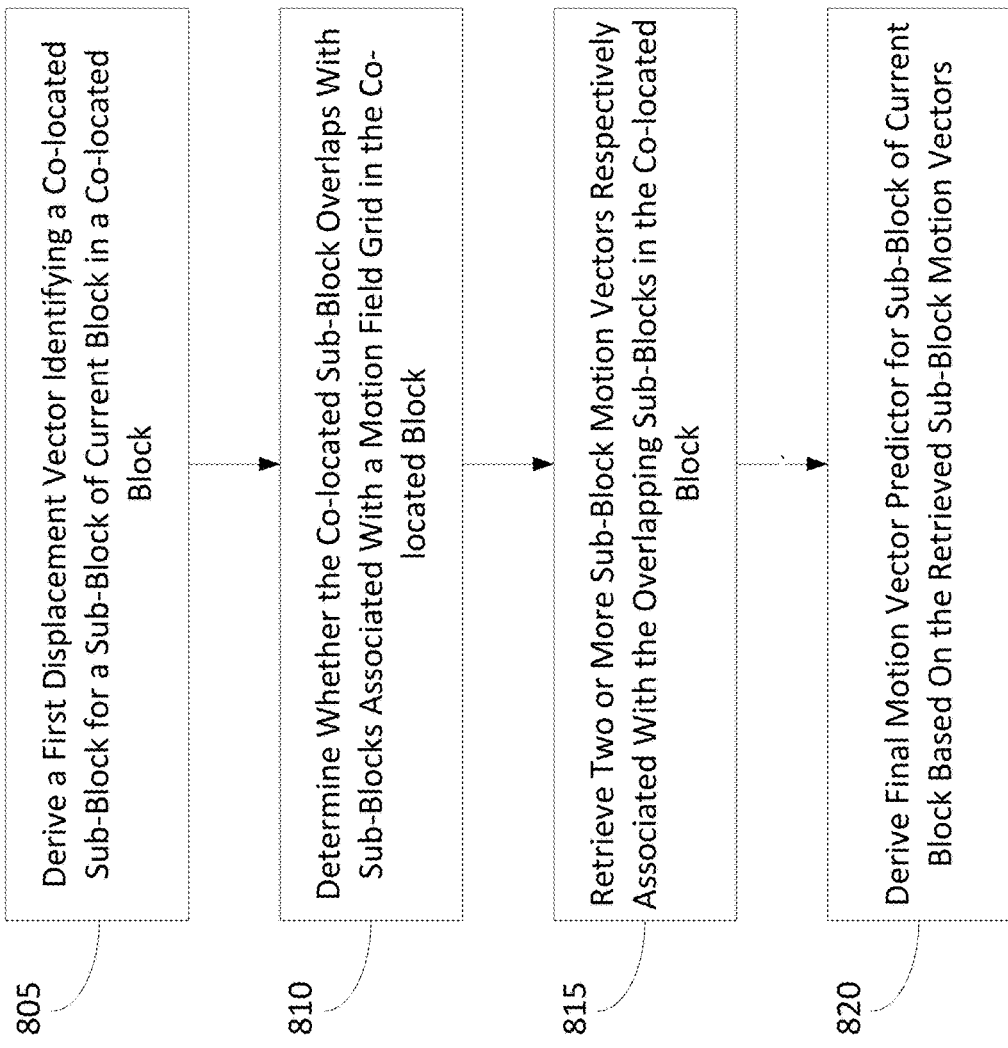
FIG. 8 is a flowchart of an example process for fusing sub-block motion vector predictors into one sub-block motion vector predictor during video coding and decoding, according to an embodiment of the present disclosure.

FIG. 8 illustrates an exemplary process 800 for fusing sub-block motion vector predictors into one sub-block motion vector predictor during video coding and decoding.

Figure 3:
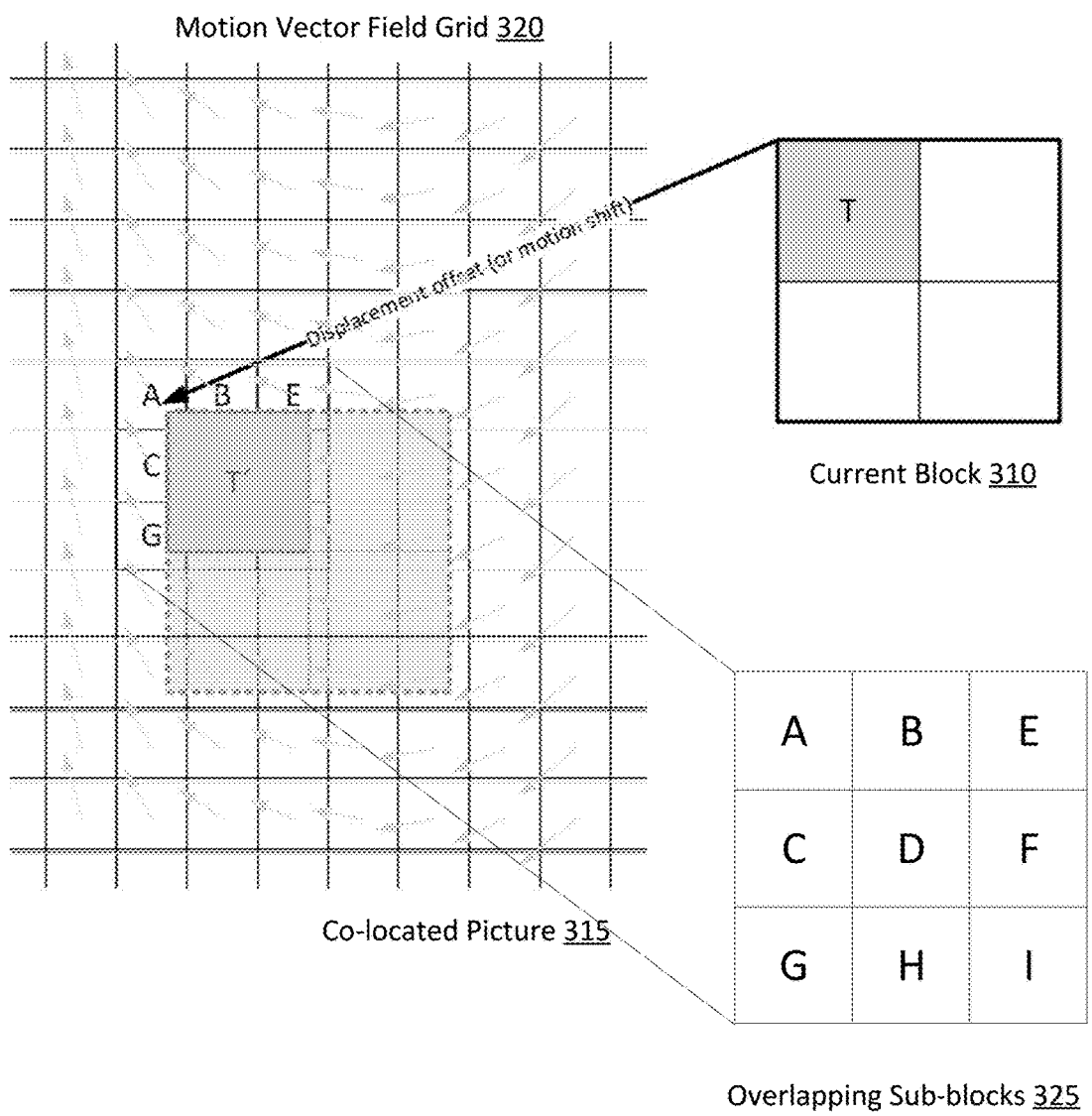
FIG. 3 illustrates an example of a sub-block overlapping the motion vector field grid in co-located picture, according to an embodiment of the present disclosure.

At operation 805, a first displacement vector identifying a co-located sub-block of a co-located block in a co-located picture may be derived for a sub-block of a current block. As an example, as shown in FIG. 2 and FIG. 3, sub-block T', a co-located sub-block of a co-located picture (215 or 315) may be identified based on a first displacement vector of a current block (210 or 310).

At operation 810, whether the co-located sub-block overlaps with one or more sub-blocks associated with a motion field grid in the co-located picture may be identified. As an example, it may be determined whether sub-block T' overlaps any co-located sub-blocks in the co-located picture (215 or 315).

At operation 815, based on determining that the co-located sub-block does overlap with the one or more sub-blocks, one or more sub-block motion vectors respectively associated with the one or more sub-blocks being overlapped may be retrieved. As an example, sub-block motion vectors associated with sub-blocks A, B, C and D (overlapping sub-blocks 225 in FIG. 2) or sub-blocks A, B, C, D, E, F, G, H and I (overlapping sub-blocks 325 in FIG. 3) may be determined or retrieved.

At operation 820, a final motion vector predictor for the sub-block of the current block based on the one or more sub-block motion vectors may be derived. As an example, a final motion vector for sub-block T may be derived based on the sub-block motion vectors associated with sub-blocks A, B, C and D (overlapping sub-blocks 225 in FIG. 2) or sub-blocks A, B, C, D, E, F, G, H and I (overlapping sub-blocks 325 in FIG. 3).

In some embodiments, deriving the final motion vector predictor for the sub-block of the current block may include determining a first motion vector associated with a first sub-block among the one or more sub-blocks associated with the motion field grid in the co-located picture having a highest overlap with the co-located sub-block.

In some embodiments, deriving the final motion vector predictor for the sub-block of the current block may include determining a weighted average of the one or more sub-block motion vectors that are retrieved. The weighted average may be based on an area of overlap between the co-located sub-block and a respective sub-block among the one or more sub-blocks associated with the motion field grid in the co-located picture. The weighted average may be based on a distance between a position of a center pixel of the co-located sub-block and a position of a center pixel of each respective sub-block among the one or more sub-blocks associated with the motion field grid in the co-located picture. In some embodiments, the weighted average may be based on a direction associated with the one or more sub-block motion vectors. As an example, based on determining that the direction associated with at least one of the one or more sub-block motion vectors is pointing out of a picture boundary, the at least one of the one or more sub-block motion vectors may be excluded from being used in the weighted average calculations.

In some embodiments, deriving the final motion vector predictor for the sub-block of the current block may include determining a first motion vector associated with a first sub-block among the one or more sub-blocks associated with the motion field grid in the co-located picture overlapping a position of a center pixel of the co-located sub-block.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions, and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
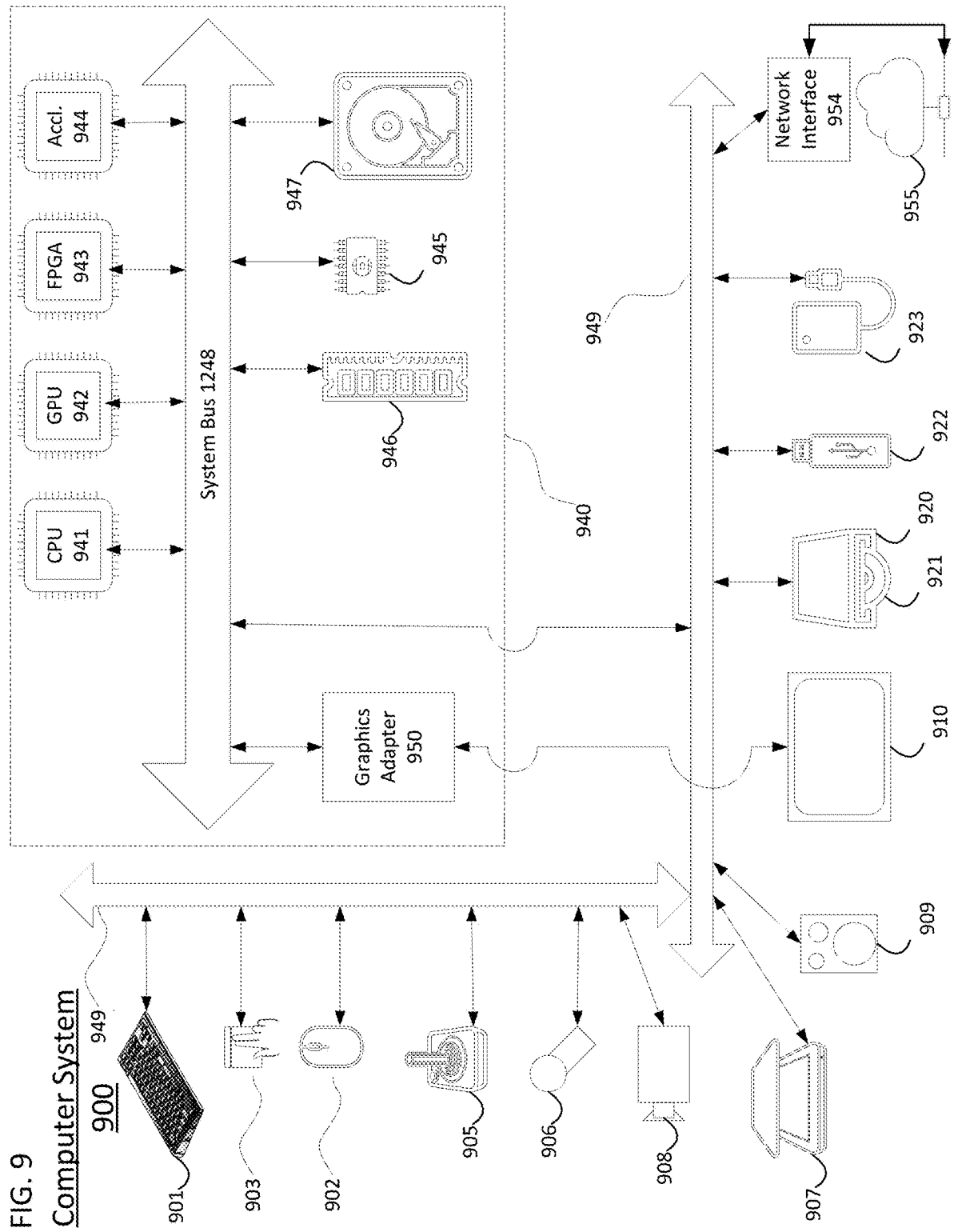
FIG. 9 is a diagram of a computer system, according to an embodiment of the present disclosure.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, screen 910, which may be for example a touchscreen, data-glove 1204, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the screen 910, data-glove 1204, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks (955) commonly require external network interface adapters (954) that attached to certain general purpose data ports or peripheral buses (949) (such as, for example USB ports of the computer system (900); others are commonly integrated into the core of the computer system (900) by attachment to a system bus 1248 as described below (for example Ethernet interface into a PC computer system or cellular network interface into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces such as external network interface adapters (954) as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory (RAM) 946, internal mass storage such as internal non-user accessible hard drives, solid-state drives (SSDs), and the like 947, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, a computer system having the architecture of computer system 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method executed by one or more processors, the method comprising:
deriving, for a sub-block of a current block in a current picture, a first displacement vector based on a motion vector of a spatial neighboring block to the left of the current block in the current picture, the first displacement vector identifying a sub-block of a co-located reference picture;
when the sub-block identified by the first displacement vector overlaps with two or more sub-blocks corresponding to a motion field grid of the co-located reference picture, retrieving two or more sub-block motion vectors used for the two or more sub-blocks; and
deriving a final motion vector predictor for the sub-block of the current block based on a weighted average corresponding to the two or more sub-block motion vectors.

2. The method of claim 1, wherein the weighted average is based on directionality of the two or more sub-block motion vectors.

3. The method of claim 2, wherein when a sub-block motion vector of the two or more sub-block motion vectors is pointing out of a picture boundary, excluding the sub-block motion vector from the weighted average.

4. A computing system, comprising:
control circuitry;
memory; and
one or more sets of instructions stored in the memory and configured for execution by the control circuitry, the one or more sets of instructions comprising instructions for:
deriving, for a sub-block of a current block in a current picture, a first displacement vector based on a motion vector of a spatial neighboring block to the left of the current block in the current picture, the first displacement vector identifying a sub-block of a co-located reference picture;
when the sub-block identified by the first displacement vector overlaps with two or more sub-blocks corresponding to a motion field grid of the co-located reference picture, retrieving two or more sub-block motion vectors used for the two or more sub-blocks; and
deriving a final motion vector predictor for the sub-block of the current block based on a weighted average corresponding to the two or more sub-block motion vectors.

5. The computing system of claim 4, wherein the weighted average is based on directionality of the two or more sub-block motion vectors.

6. The computing system of claim 5, wherein when a sub-block motion vector of the two or more sub-block motion vectors is pointing out of a picture boundary, excluding the sub-block motion vector from the weighted average.

7. A non-transitory computer-readable storage medium storing one or more sets of instructions configured for execution by a computing device having control circuitry and memory, the one or more sets of instructions comprising instructions for:
processing a bitstream of visual media data according to a format rule, wherein:
the bitstream includes coded information for a plurality of frames, including coded information for a sub-block of a current block in a current picture;
the format rule specifies that:
a first displacement vector is derived for the sub-block of the current block based on a motion vector of a spatial neighboring block to the left of the current block in the current picture, the first displacement vector identifying a sub-block of a co-located reference picture; and
when the sub-block identified by the first displacement vector overlaps with two or more sub-blocks associated with a motion field grid in the co-located picture:
two or more sub-block motion vectors are retrieved, the two or more sub-block motion vectors respectively associated with the two or more sub-blocks; and
a final motion vector predictor is derived for the sub-block of the current block based on a weighted average corresponding to the two or more sub-block motion vectors.

8. The non-transitory computer-readable storage medium of claim 7, wherein the weighted average is based on directionality of the two or more sub-block motion vectors.

9. The method of claim 1, wherein the final motion vector predictor for the sub-block of the current block is further based on one or more sub-block motion vectors from a second co-located reference picture.

10. The method of claim 1, further comprising identifying the sub-block by combining the first displacement vector with coordinates of the current block.

11. The method of claim 10, wherein the first displacement vector is set to zero when the spatial neighboring block does not have a motion vector that uses the co-located reference picture.

12. The method of claim 1, wherein the weighted average is based on a plurality of prediction blocks associated with the two or more sub-block motion vectors.

13. The computing system of claim 4, wherein the final motion vector predictor for the sub-block of the current block is further based on one or more sub-block motion vectors from a second co-located reference picture.

14. The computing system of claim 4, wherein the first displacement vector is set to zero when the spatial neighboring block does not have a motion vector that uses the co-located reference picture.

15. The non-transitory computer-readable storage medium of claim 7, wherein the first displacement vector is set to zero when the spatial neighboring block does not have a motion vector that uses the co-located reference picture.

* * * * *